United States Patent
Haist et al.

(10) Patent No.: US 11,953,102 B2
(45) Date of Patent: Apr. 9, 2024

(54) CONTROL SLIDE HAVING A DEFINED BROKEN CIRCULAR RING EDGE

(71) Applicant: Robert Bosch GmbH, Stuttgart (DE)

(72) Inventors: Andreas Haist, Freudenstadt-Dietersweiler (DE); Holger Stehling, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/170,975

(22) Filed: Feb. 17, 2023

(65) Prior Publication Data

US 2023/0265930 A1    Aug. 24, 2023

(30) Foreign Application Priority Data

Feb. 21, 2022  (DE) ...................... 10 2022 201 755.2

(51) Int. Cl.
*F16K 11/07* (2006.01)
*F15B 13/04* (2006.01)

(52) U.S. Cl.
CPC .......... *F16K 11/07* (2013.01); *F15B 13/0402* (2013.01); *F16K 11/0708* (2013.01)

(58) Field of Classification Search
CPC .. F16K 11/07; F16K 11/0708; F15B 13/0402; F15B 2013/008
See application file for complete search history.

(56) References Cited

U.S. PATENT DOCUMENTS

| 4,220,178 | A | * | 9/1980 | Jackson | F16K 39/04 |
| | | | | | 251/324 |
| 2015/0252908 | A1 | * | 9/2015 | Nagasaki | F16K 11/0708 |
| | | | | | 137/625.69 |
| 2017/0051841 | A1 | * | 2/2017 | Huynh | F16K 31/05 |
| 2020/0158255 | A1 | * | 5/2020 | Neff | F15B 13/0426 |

* cited by examiner

*Primary Examiner* — Kelsey E Cary
(74) *Attorney, Agent, or Firm* — Maginot, Moore & Beck LLP

(57) ABSTRACT

A control slide for use in a slide valve is disclosed. The control slide has a central axis and at least one first portion which is circular-cylindrical with respect to the central axis, all the first portions having the same diameter. The control slide further has at least one assigned second portion which is adjacent to each first portion, which second portion ends toward the first portion with an end face which extends inclined by at least 45° in relation to the central axis so that the first portion, together with the end face, forms a circular ring edge which extends around the central axis in a circular ring shape having a substantially constant cross-sectional shape. The control slide is made of steel. The at least one first portion is surface-hardened such that the hardness on the surface of the control slide decreases from the first portion via the circular ring edge toward the end face. The mentioned cross-sectional shape of the circular ring edge is composed of a straight portion and a curved portion without abrupt bends. The straight portion directly adjoins the assigned first portion, the curved portion directly adjoins the straight portion and the end face, the diameter of the control slide in the straight portion decreases from the first to the (Continued)

second portion. The hardness on the surface of the control slide decreases steadily from the end of the straight portion, which faces the first portion, into the first portion.

20 Claims, 2 Drawing Sheets

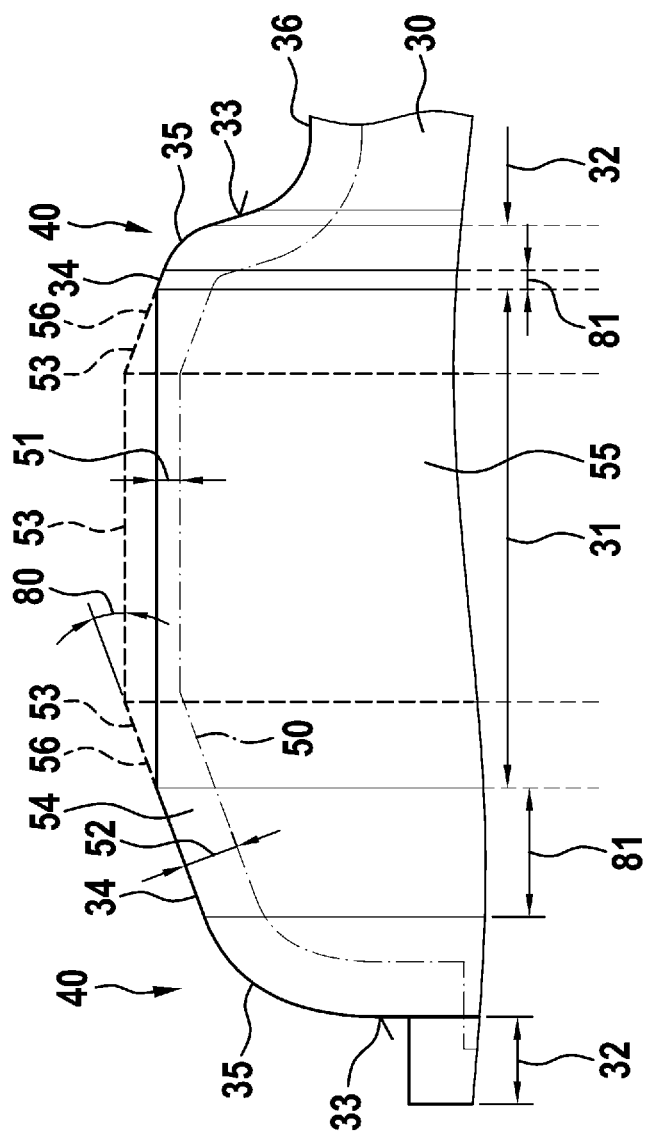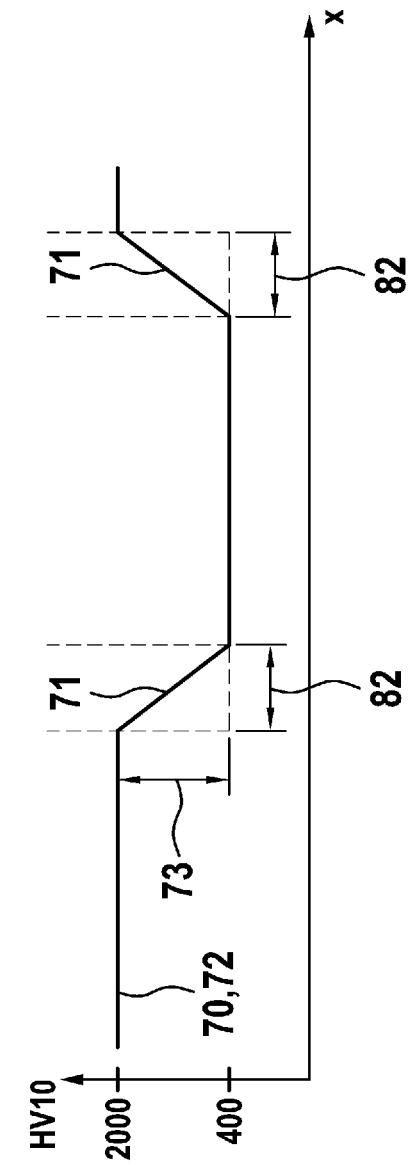
Fig. 2
Fig. 3

CONTROL SLIDE HAVING A DEFINED BROKEN CIRCULAR RING EDGE

This application claims priority under 35 U.S.C. § 119 to patent application no. DE 10 2022 201 755.2, filed on Feb. 21, 2022 in Germany, the disclosure of which is incorporated herein by reference in its entirety.

The disclosure relates to a control slide for use in a slide valve and to a method for the production thereof.

BACKGROUND

The control edges on the control slide of a hydraulic slide valve that extend around a central axis in a circular ring shape are usually designed to be sharp-edged. Furthermore, such control slides are usually hardened on the surface in order to minimize the wear on first portions of the control slide that rest sealingly and slidingly on a hole in the housing of the corresponding slide valve. It has been shown here that, in individual cases, score marks or other damage to the mentioned hole can be found after the slide valve has been in operation for some time. It should be noted that this problem can occur not only at the control edges, but also at further circular ring edges of the control slide, with reference being made to the statements regarding FIG. 1.

The control slide according to the disclosure has the advantage that the mentioned damage to the hole in the housing of the slide no longer occurs. At the same time, it is simple and inexpensive to produce. In particular, the production effort increases only insignificantly compared to a conventional control slide, in particular when the corresponding blank is produced using a CNC lathe. The corresponding slide valve is particularly well-suited for the regulation of the displacement volume of an axial piston machine in a swashplate or angled-axis design. In this case of application, it is important for the control slide to run in a particularly low-friction manner. Even the smallest friction fluctuations significantly impair the dynamic regulation of the axial piston machine, in particular when the slide valve is part of an electronic control loop and is not, for example, a purely hydraulic-mechanical control loop in which very high forces act. The score marks mentioned above cause such friction fluctuations.

SUMMARY

According to disclosure, it is proposed that the mentioned cross-sectional shape of the circular ring edge is composed of a straight portion and of a curved portion without abrupt bends, the straight portion directly adjoining the associated first portion, the curved portion directly adjoining the straight portion and the end face, the diameter of the control slide in the straight portion decreasing from the first toward the second portion, the hardness at the surface of the control slide decreasing steadily from the end of the straight portion, which faces the first portion, into the first portion. It should be noted that the disclosed features refer to the finished control slide and not to the corresponding blank used within the scope of the production method according to the disclosure.

The circular ring edge can be a control edge of the control slide. However, it is also conceivable that the second portions are groove-like with a small depth, which is intended to prevent the control slide from getting stuck in the associated hole. The problem explained above occurs in both cases.

The end face is preferably designed in the shape of a circular cone with respect to the central axis. It preferably points toward the second portion. If the mentioned angle of inclination of the end face is 90°, as frequently occurring in the prior art, a planar end face is obtained as the limit case. The cross-sectional shape of the circular ring edge is preferably viewed in a plane which contains the central axis.

The control slide according to the disclosure is preferably used in a slide valve which comprises a hole in which the control slide is accommodated in a linearly movable manner, wherein the at least one first portion rests against the hole in a sliding manner. In exceptional cases, the mentioned hole is designed as a stepped hole which has a plurality of circular-cylindrical portions, each of which is designed to be circular-cylindrical with respect to the central axis. As a rule, the mentioned hole is continuously circular cylindrical, in any case where the first portions rest.

Advantageous developments and improvements of the disclosure are specified below.

It can be provided that the mentioned hardness decrease is between 50% and 90%, preferably between 65% and 75%, of the initial hardness. The mentioned hardnesses are preferably all measured according to the Vickers method (https://en.wiki_pedia.org/wikiNickers hardness test), with the HV10 version most preferably being used. With the mentioned values, the desired hardness in the first portion can be achieved with an economical process time, while, at the same time, material removal during grinding is possible, which is required for the production of the exact diameter of the first portion.

It can be provided that the inclination between the straight portion and the central axis is between 10° and 30°, preferably between 15° and 25°. The tests by the applicant have shown that the desired prevention of the score marks is achieved with this inclination. At the same time, the hydraulic function in particular of the control edges is substantially not adversely affected.

It can be provided that the length of the straight portion in the direction of the central axis is between 0.5% and 20%, preferably between 2.5% and 11%, of the diameter of the first portion. A length that is closer to the lower end of the specified range is preferred at the control edges. The upper end of the mentioned range is more likely used at the remaining circular ring edges.

It can be provided that the length of the region of the first portion in which the mentioned hardness decrease takes place is between 0.5% and 10%, preferably between 1% and 6%, of the diameter of the first portion. With this design, the desired hardness decrease is so minor that the score marks mentioned do not occur. At the same time, the hardness in the middle of the first portion reaches the desired value.

It can be provided that the straight portion transitions tangentially into the curved portion. The risk of a burr forming at the corresponding transition is very low. The mentioned burr cannot therefore impede the low-friction running of the control slide.

It can be provided that the curved portion transitions tangentially into the end face. The risk of a burr forming at the corresponding transition is very low. The mentioned burr cannot therefore impede the low-friction running of the control slide.

It can be provided that the curved portion is circular over its entire extent. As a result, the curved portion can be designed to be particularly small, with it still contributing to preventing score marks in the hole in the housing of the slide valve, namely by preventing the formation of burrs.

It can be provided that a radius of the circular shape mentioned is between 0.1% and 10%, preferably between 0.5% and 5%, of the diameter of the first portion. A radius that is closer to the lower end of the mentioned range is preferred at the control edges. The upper end of the mentioned range is more likely used at the remaining circular ring edges.

It can be provided that the inclination between the end face and the central axis is between 60° and 90°, preferably between 75° and 85°. This simplifies the production of the control slide. The desired hydraulic function is nevertheless ensured in particular at the control edges.

It can be provided that the hard layer contains more carbon than a core of the control slide, wherein the hard layer contains more nitrogen than the core of the control slide. The hard layer is preferably produced by means of gas nitrocarburizing. The core of the control slide preferably contains no nitrogen.

A method for producing a control slide according is disclosed, wherein the following steps are carried out in the order indicated:
providing a blank of the control slide which is close to the final contour and in which the at least one circular ring edge is finished such that the straight portion is extended toward the first portion;
gas nitrocarburizing of the blank, preferably of the entire blank;
producing the final shape of the at least one first portion.

The blank and in particular the at least one circular ring edge is preferably produced by means of a lathe. The straight portion is preferably extended in a straight alignment. The at least one first portion is preferably ground in order to produce the final shape, wherein most preferably all the first portions are ground in one operation.

It can be provided that material removal during the production of the final shape of the first portion is between 10 μm and 200 μm. Said material removal is preferably 75 μm.

Of course, the features mentioned above and those still to be explained below can be used not only in the respectively specified combinations, but also in other combinations or alone, without departing from the scope of the present disclosure.

BRIEF DESCRIPTION OF THE DRAWINGS

The disclosure is explained in more detail below with reference to the accompanying drawings. In the drawings:

FIG. 2 shows a partial side view of a control slide according to the disclosure; and FIG. 3 shows a diagram of the hardness profile along the control slide.

DETAILED DESCRIPTION

Figure 1:
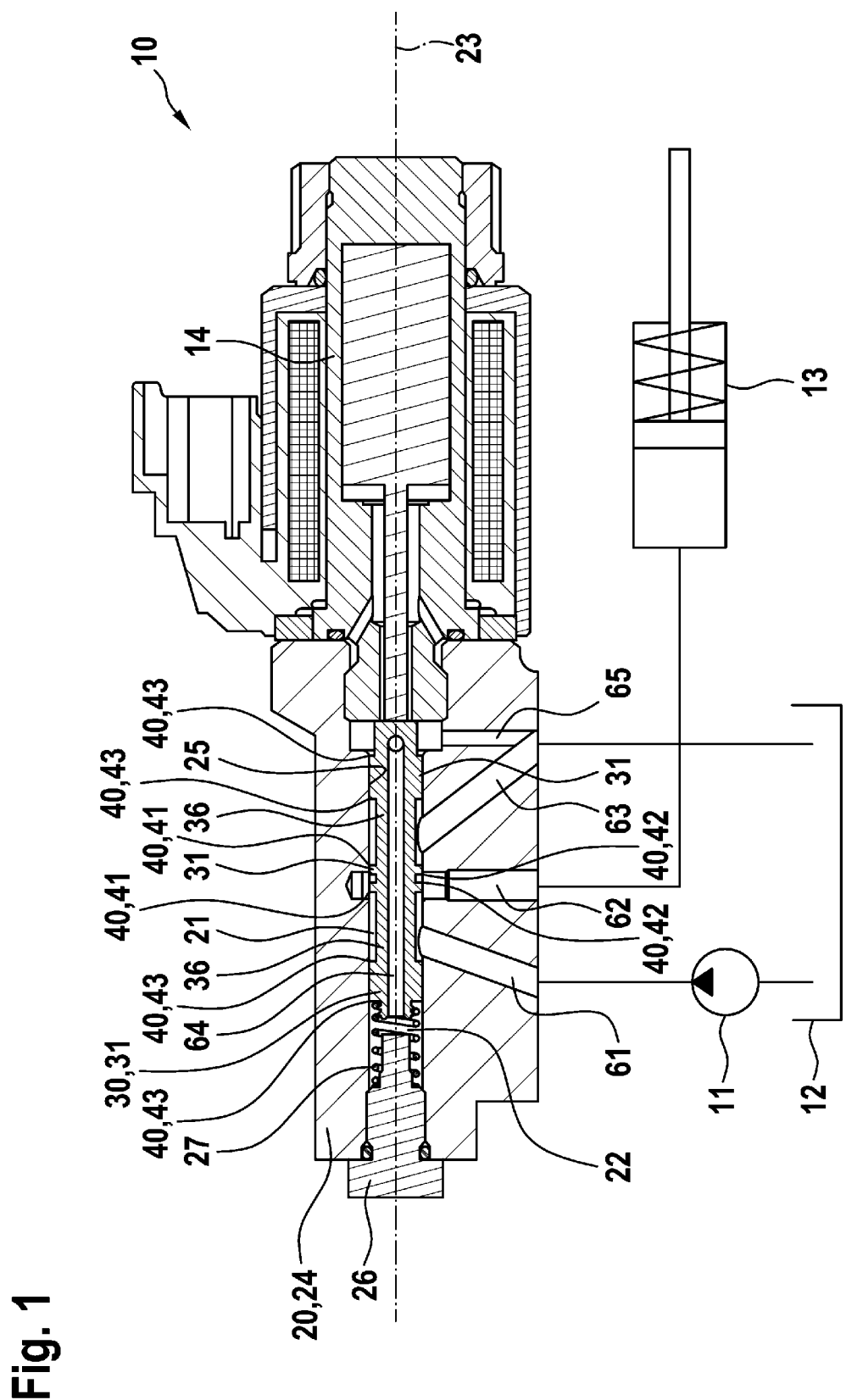
FIG. 1 shows a hydraulic system having a slide valve, which comprises a control slide according to the disclosure.

FIG. 1 shows a hydraulic system 10 having a slide valve 20, which comprises a control slide 30 according to the disclosure. The slide valve 20 comprises a housing 24 which is provided with a hole 25 which has a constant cross-sectional shape which is circular with respect to the central axis 23 over its entire length. A control slide 30 is accommodated in the hole 25 movably in the direction of the central axis 23. At the left-hand end in FIG. 1, the hole 25 is closed in a fluid-tight manner by a closure screw 26, wherein a spring 27 is installed between the control slide 30 and the closure screw 26. From the opposite end, the hole 25 is closed by an actuating magnet 14, which can apply an actuating force acting in the direction of the central axis 23 counter to the pretension of the spring 27 to the control slide 30. The level of the actuating force can be adjusted by varying the current flowing in the actuating magnet 14 so that the position of the control slide 30 is adjustable.

The control slide 30 has a total of three first portions 31 which are circular-cylindrical with respect to the central axis 23. The first portions 31 are opposite the hole 25 at a very short distance so that a sealing effect is provided. They are integrally connected to one another via neck portions 36, wherein the neck portions 36 have a diameter which is significantly reduced relative to the hole 25 so that pressure fluid can flow there with a low flow resistance. The pressure fluid is preferably a liquid and most preferably hydraulic oil.

A first, a second and a third connection 61; 62; 63, which are each designed in the form of an, optionally stepped, circular-cylindrical channel, open transversely to the central axis 23 into the hole 25. In the end position of the control slide 30 shown in FIG. 1, the first connection 61 is connected to the second connection 62, with the third connection 63 being blocked. In the opposite end position of the control slide 30, the third connection 63 is connected to the second connection 62, with the first connection 61 being blocked.

The first connection 61 is connected to a pressure fluid source in the form of a pump 11, wherein the third connection 63 is connected to a pressure fluid sink in the form of a tank 12. The second connection 62 is connected to an actuator 13, which is designed, for example, in the form of a single-acting hydraulic cylinder. The present slide valve 20 is provided for use with an axial piston pump in a swashplate design, wherein the pivot position of the corresponding diagonal plate can be adjusted with the present actuator 13.

The left-hand first portion 31 delimits a first pressure chamber 21 and a second pressure chamber 22 in a substantially fluid-tight manner so that only very small leakages are present. In the first pressure chamber 21, the pressure is applied at the first connection 61, i.e., a high pressure. The second pressure chamber 22 is connected to the third connection 63 by a channel 64 in the control slide 30 and a channel 65 in the housing 24 so that a low pressure is applied there.

The present disclosure deals with a problem that occurs on the circular ring edges 40 on the control slide 30. These circular ring edges 40 comprise the two control edges 41, with which the opening cross section of the continuously adjustable apertures of the present slide valve 20 are set. The groove edges 42 are caused by grooves or flat grooves on the circumference of the first portions 31, which are intended to prevent the control slide 30 from becoming stuck in the hole 25. The sealing edges 43 are attributed to the fact that the associated first portion 31 has a sealing function.

The control slide 30 is made of steel, wherein it is surface-hardened. As a hardening method, gas nitrocarburizing is preferably used, wherein the problem underlying the disclosure also occurs during use-hardening.

When the control slide is produced, a blank is first surface-hardened over its entire outer surface. The first portions 31, the diameter of which is to be kept very precisely to the intended dimension, are produced after the surface-hardening by means of grinding. In this case, only minimal material removal takes place, which only partially removes the hard layer on the surface. Nevertheless, the hardness on the first portions 31 is significantly reduced relative to the remaining control slide 30. The surface hardness changed abruptly on all circular ring edges 40. If the circular ring edges 40 are designed in a sharp-edged manner as in the prior art, this hardness jump leads to a blade-sharp cutting edge which is located at a point which contacts the hole 25. As a result, score marks which impair the function of the slide valve can arise on the hole 25. The control slide 30 can get stuck in the hole 25 or the frictional force there can fluctuate. The desired low leakage incidence under the influence of high pressures is no longer provided. This problem can be remedied with the cross-sectional shape of the circular ring edges 40 described with reference to FIG. 2.

FIG. 2 shows a partial side view of a control slide 30 according to the disclosure. The left-hand end of the control slide 30 in FIG. 1 is shown. In particular, the hardening depths 51; 52 and the radius of the curved portion 35 and the length 81 of the straight portion 34 are shown in a highly exaggerated manner.

FIG. 2 shows two circular ring edges 40. The left-hand circular ring edge 40 comprises a planar end face 33 which is oriented perpendicular to the central axis (no. 23 in FIG. 1). The end face 33 of the right-hand circular ring edge 40 is designed in the form of a circular cone with respect to the central axis and has an inclination of 75° to the central axis. As a result, the transition to the adjoining neck portion 36 can be more easily rounded in order to minimize the material stresses there. In both cases, the end face 33 forms the end of an associated second portion 32 of the control slide 30, in which the diameter is reduced relative to the first portion 31.

A curved portion 35 free of abrupt bends adjoins the end face 33 toward the first portion 31. Viewed in cross section, the curved portion 35 is preferably circular, wherein it transitions tangentially or free of abrupt bends both into the end face 33 and into the straight portion 34. The straight portion 34 is designed in the form of a circular cone with respect to the central axis, wherein its inclination 80 to the central axis is 20°, for example.

FIG. 2 shows the shape of the blank 53 before grinding is shown with dashed lines. It can be seen in particular that the straight portion 34 is continued in an aligned manner in the region of the hardness decrease 82 toward the first portion 31. If the blank 53 is now hardened on the surface, a substantially constant hardening depth 52 results substantially everywhere on the entire blank. The lower limit 50 of the hard layer 54 is shown in FIG. 2 as a dotted-dashed line. It is understood that this is not a hard limit, but rather the hardness changes steadily from the core 55 to the surface of the control slide 30, wherein the change in hardness is always more drastic toward the surface. In the context of the present application, the lower limit 50 is defined as the location at which the hardness is increased by 10% over the hardness in the core 55 due to the surface hardening.

If the first portion 31 is now ground down in order to obtain a circular-cylindrical shape with respect to the central axis with an exact diameter and high surface quality, the hardening depth is thereby reduced to the dimension 51. In the region of the ground, straight portion 56, the hardening depth changes steadily between the original dimension 52 and the ground dimension 51. As a result, the hardness on the surface of the control slide 30 also changes steadily. An abrupt change in hardness as in the known sharp-edged circular ring edge does not take place. As a result, score marks and other damage to the hole (no. 25 in FIG. 1) are prevented.

FIG. 3 shows a diagram of the hardness profile along the control slide. On the horizontal, the path x is plotted along the central axis. On the vertical, the hardness on the surface of the control slide is plotted, which was measured in the present case according to the measuring method HV10.

In the middle of the first portion 31, the surface hardness is comparatively low and substantially constant. At the two ends of the first portion 31, in the regions 82 in which the straight portion 56 has been ground down, the surface hardness steadily increases to a high value, which is substantially constant everywhere apart from the first portion 31.

REFERENCE SIGNS

10 Hydraulic system
11 Pump
12 Tank
13 Actuator
14 Actuating magnet
20 Slide valve
21 First pressure chamber
22 Second pressure chamber
23 Central axis
24 Housing
25 Hole
26 Closure screw
27 Spring
30 Control slide
31 First portion
32 Second portion
33 End face
34 Straight portion
35 Curved portion
36 Neck portion
40 Circular edge
41 Control edge
42 Groove edge
43 Sealing edge
50 Lower limit of the hard layer
51 Hardening depth in the first portion
52 Hardening depth aside from the first portion
53 Shape of the control slide blank before grinding
54 Hard layer
55 Core
56 Ground-down straight portion
61 First connection
62 Second connection
63 Third connection
64 Channel in the valve slide
65 Channel in the housing
70 Hardness profile
71 Continuous hardness decrease at the end of the first portion
72 Initial hardness
73 Hardness decrease
80 Inclination
81 Length of the straight portion
82 Length of the region of hardness decrease

What is claimed is:
1. A control slide for use in a slide valve, with the control slide defining a central axis, the control slide comprising:
at least one first portion which is circular-cylindrical with respect to the central axis,
at least one second portion assigned to each first portion, each second portion including an end face at an end of the second portion that is nearest to the associated first portion, the end face extending inclined by at least 45° in relation to the central axis, wherein a circular ring edge, which extends around the central axis in a circular ring shape having a substantially constant cross-sectional shape, is formed between the first portion and the second portion, wherein the control slide is made of steel, wherein the at least one first portion is surface-hardened in such a way that the hardness on the surface of the control slide decreases from the first portion via the circular ring edge toward the end face, wherein the cross-sectional shape of the circular ring edge includes a straight portion and a curved portion which is free of abrupt bends, the straight portion directly adjoining the associated first portion, the curved portion directly adjoining the straight portion and the end face, wherein a diameter of the control slide in the straight portion decreases in a direction from the first portion toward the second portion, and wherein the hardness on the surface of the control slide decreases steadily from the end of the straight portion, which faces the first portion, into the first portion.

2. The control slide according to claim 1, wherein the mentioned hardness decrease is between 50% and 90% of the initial hardness.

3. The control slide according to claim 2, wherein an inclination between the straight portion and the central axis is between 10° and 30°.

4. The control slide according to claim 3, wherein:
the mentioned hardness decrease is between 65% and 75% of the initial hardness, and an inclination between the straight portion and the central axis is between 15° and 25°.

5. The control slide according to claim 1, wherein a length of the straight portion in the direction of the central axis is between 0.5% and 20% of a diameter of the first portion.

6. The control slide according to claim 5, wherein the length of the straight portion in the direction of the central axis is between 2.5% and 11% of the diameter of the first portion.

7. The control slide according to claim 1, wherein a length of a region of the first portion in which the mentioned hardness decrease takes place is between 0.5% and 10% of a diameter of the first portion.

8. The control slide according to claim 7, wherein the length of the region of the first portion in which the mentioned hardness decrease takes place is between 1% and 6% of the diameter of the first portion.

9. The control slide according to claim 1, wherein the straight portion transitions tangentially into the curved portion.

10. The control slide according to claim 1, wherein the curved portion transitions tangentially into the end face.

11. The control slide according to claim 1, wherein the curved portion is circular over its entire extent.

12. The control slide according to claim 11, wherein a radius of the mentioned circular shape is between 0.1% and 10% of a diameter of the first portion.

13. The control slide according to claim 12, wherein a radius of the mentioned circular shape is between 0.5% and 5% of the diameter of the first portion.

14. The control slide according to claim 1, wherein an inclination between the end face and the central axis is between 60° and 90°.

15. The control slide according to claim 14, wherein the inclination between the end face and the central axis is between 75° and 85°.

16. The control slide according to claim 1, wherein:
a hard layer contains more carbon than the core of the control slide, and the hard layer contains more nitrogen than the core of the control slide.

17. The control slide according to claim 1, wherein all the first portions have an equal diameter.

18. A method for producing a control slide according to claim 1, wherein the following steps are performed in the indicated sequence:
providing a blank of the control slide which is close to a final contour and in which the at least one circular ring edge is finished such that the straight portion is extended toward the first portion;
gas nitrocarburizing the blank; and
producing a final shape of the at least one first portion.

19. The method according to claim 18, wherein material removal during the production of the final shape of the first portion is between 10 μm and 200 μm.

20. The method according to claim 18, wherein gas nitrocarburizing the blank includes gas nitrocarburizing the entire blank.

* * * * *